June 23, 1942. J. E. BEANBLOSSOM 2,287,225
PRODUCTION OF CARBON TETRACHLORIDE
Filed Nov. 20, 1940
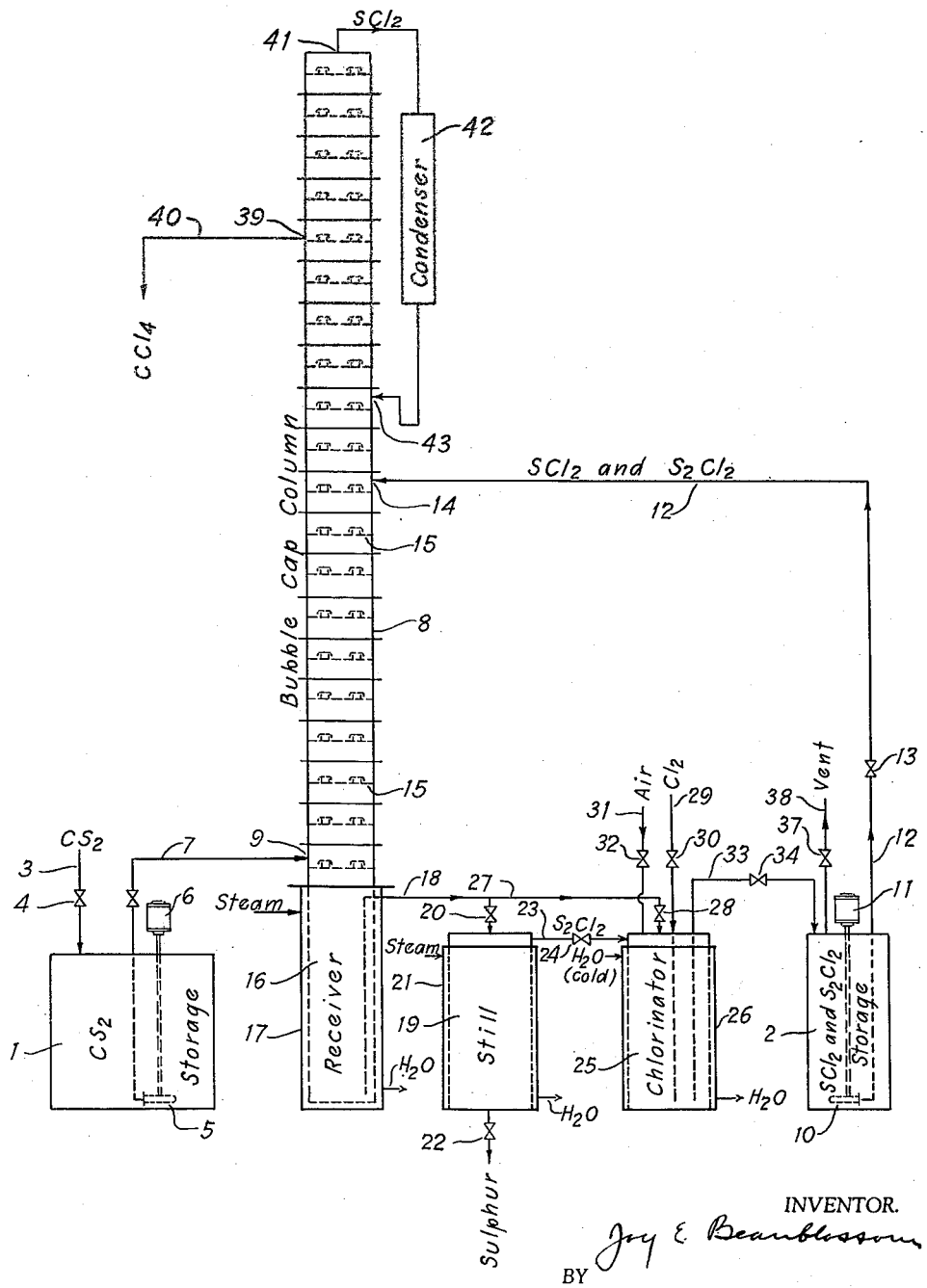
INVENTOR.
Joy E. Beanblossom
BY
Kenneth Stuart
ATTORNEY.

Patented June 23, 1942

2,287,225

UNITED STATES PATENT OFFICE 2,287,225

PRODUCTION OF CARBON TETRACHLORIDE

Joy E. Beanblossom, Niagara Falls, N. Y., assignor to Hooker Electrochemical Company, Niagara Falls, N. Y., a corporation of New York Application November 20, 1940, Serial No. 366,427

10 Claims. (Cl. 260—664)

My process may be exemplified by the chlorination of carbon disulphide to produce carbon tetrachloride.

The fundamental reaction of carbon disulphide with chlorine is as follows:

$$CS_2 + 3Cl_2 \rightarrow CCl_4 + S_2Cl_2 \qquad (1)$$

This reaction readily goes to substantial completion, but there is not always a sufficient demand for the $S_2Cl_2$ to render the process based on this reaction commercially practicable. It is therefore necessary to find a way to return the sulphur monochloride to the process; also to remove from the system at some stage a quantity of sulphur equivalent to that introduced as $CS_2$. Herein lies one of the chief difficulties in the way of production of carbon tetrachloride from carbon disulphide.

Sulphur monochloride may be considered a chlorinating agent and as such it may be reacted with more carbon disulphide. However, in an ordinary batch operation this reaction will not go to completion. The incomplete reaction may, for purposes of illustration, be written as follows:

$$CS_2 + 2S_2Cl_2 \rightleftarrows$$
$$0.2CS_2 + 0.4S_2Cl_2 + 0.8CCl_4 + 4.8S \qquad (2)$$

Moreover, if an attempt be made to distill off the product it is found that the reaction tends to reverse and the product comes off mixed with $CS_2$, from which its separation is difficult.

Reaction 2 can, if preferred, be carried out so as to leave no unreacted $S_2Cl_2$, by using an excess of $CS_2$, as follows:

$$3CS_2 + 4S_2Cl_2 \rightleftarrows CS_2 + 2CCl_4 + 12S \qquad (3)$$

However, the difficulty of separating the product from the sulphur and $CS_2$ still remains.

Instead of the elemental chlorine of Equation 1 sulphur dichloride may be used as the chlorinating agent. The reaction is then as follows:

$$CS_2 + 6SCl_2 \rightarrow CCl_4 + 4S_2Cl_2 \qquad (4)$$

Reaction 4 readily goes to completion. However, here again sulphur monochloride is a by product, and its disposal constitutes a problem. Three of the $4S_2Cl_2$ of Equation 4 could be chlorinated back to replace the $6SCl_2$, but one $S_2Cl_2$ would still remain to be disposed of. If an attempt be made to eliminate this by product problem by reducing the proportion of $SCl_2$ in Equation 4, the reaction refuses to go to completion. This incomplete reaction may be written, for illustrative purposes, as follows:

$$CS_2 + 2SCl_2 \rightleftarrows$$
$$0.1CS_2 + 0.2S_2Cl_2 + 0.9CCl_4 + 3.4S \qquad (5)$$

As in the case of Reaction 2, if an attempt be made to distill off the product the reaction tends to reverse and the product comes off contaminated with $CS_2$.

Various expedients have been tried in order to induce Reactions 2 and 5 to go to completion, such as carrying out the reaction under pressure and in the presence of catalysts. However, these efforts have been only partially successful. Moreover, even if these reactions went to completion the difficulty of distilling off the product from the sulphur would still remain, as the $CCl_4$ tends to react with the sulphur, to form $CS_2$ and $S_2Cl_2$.

A more successful way of overcoming the difficulty is to alternate Reactions 1 and 3, distilling off product after the first reaction, transferring the by product to the second reaction, removing the sulphur after the second reaction and recycling the residuals to the first reaction. This is of course quite a complicated matter, both as to the apparatus and as to the supervision required.

I have discovered that if gaseous chlorine be introduced at an intermediate point in a plate column and carbon disulphide, which boils at 46.2° C., be introduced near the bottom of the column and caused to rise in the column in vapor phase and contact the chlorine, carbon tetrachloride may be drawn off at the top and sulphur at the bottom of the column. If the column is tall enough, the product will be of high purity, requiring very little subsequent treatment. The explanation of this is as follows:

At the point of introduction of the chlorine we have Reaction 1 taking place. The $S_2Cl_2$ of this reaction, boiling at 138° C. and being therefore liquid, descends from plate to plate, coming into contact with $CS_2$ vapor, which bubbles through the liquid $S_2Cl_2$ on the plates. As the $S_2Cl_2$ descends, more and more of it becomes decomposed, liberating elemental sulphur. At first the sulphur is in solution in the $S_2Cl_2$. As the $S_2Cl_2$ decreases and the sulphur increases a point is reached at which the latter exceeds the limit of its solubility in the former. Thereafter sulphur is present in molten form. On the lowermost plate, the molten sulphur is scrubbed with $CS_2$. The residual $S_2Cl_2$ is thereby largely reacted out, as follows:

$$xCS_2 + 2S_2Cl_2 \rightarrow (x-1)CS_2 + CCl_4 + 6S \qquad (6)$$

One third of the $CS_2$ reacts with the $S_2Cl_2$ and two thirds with elemental chlorine.

Some of the chlorine reacts with the $S_2Cl_2$ of Reaction 1 to produce $SCl_2$, which is taken off from the top of the column and recycled.

At the point of introduction of the $CS_2$, we have a great excess of $CS_2$ over the $S_2Cl_2$ reaching that point. In theory, if the column were of infinite height there would be an infinite excess of $CS_2$ and Reaction 6 would go to complete elimination of $S_2Cl_2$. In practice, this result is of course unattainable. The sulphur leaving the lowermost plate therefore contains a small quantity of $S_2Cl_2$ which is easily recovered by distillation and may be recycled. Nevertheless, in a column of perfectly practicable height, by using a slight excess of chlorine I am able to produce $CCl_4$ free from $CS_2$. This is a matter of the greatest importance, as it is impracticable, on a commercial scale, to separate $CCl_4$ from $CS_2$ by fractionation. Under the same conditions may product may contain traces of $SCl_2$ and $S_2Cl_2$, but only in such amounts as can be removed without great difficulty or expense by fractionation or treatment with lime or both. The lime converts $SCl_2$ and $S_2Cl_2$ to calcium sulphite and calcium chloride, from which the product is separated by another fractionation. The loss of yield in this purification step is negligible.

The net result of Reaction 6, following Reaction 1, as in my process, is therefore for practical purposes as follows:

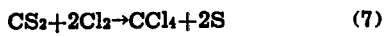

$$CS_2 + 2Cl_2 \rightarrow CCl_4 + 2S \qquad (7)$$

If the $CCl_4$ and $2S$ of Equation 7 were present together, the latter would be in solution in the former, and any attempt to separate them would result in a reversal of the reaction, producing $CS_2$ and $S_2Cl_2$. However, it will be noted that the $CCl_4$ is at the top and the $2S$ at the bottom of the column; hence the separation has already been made. It will also be noted that the $2S$ of Reaction 7 balances the sulphur introduced as $CS_2$ and may be recycled as such.

Reaction 7, which in a batch operation would be entirely impossible is therefore by my process rendered not only possible but practicable.

Instead of elemental chlorine, I may use sulphur dichloride as the chlorinating agent, introducing it near the middle of the column as in the face of the chlorine. In that case we have Reaction 4 taking place at the point of its introduction. The sulphur dichloride, which boils at 59° C., is preferably introduced in liquid phase. The $S_2Cl_2$ produced by the reaction and the residual liquid $SCl_2$, if any, then descend from plate to plate against a rising stream of $CS_2$ vapor, which bubbles through the liquid on the plates. The $SCl_2$, if any, being the more reactive, soon disappears, leaving only $S_2Cl_2$. As the $S_2Cl_2$ continues to descend, the proportion of $S_2Cl_2$ diminishes and the proportion of sulphur increases. Upon the lowermost plate, as in the previous case, we therefore have $CS_2$ scrubbing residual $S_2Cl_2$ out of molten sulphur, in accordance with Reaction 6.

In a column of infinite height the net result of Reaction 6, following Reaction 4, as in my process, would for practical purposes be as follows:

$$CS_2 + 2SCl_2 \rightarrow CCl_4 + 4S \qquad (8)$$

In practice, when using a column of moderate height, I find it desirable to supply an excess of $SCl_2$, which may be as much as 100 per cent over that of Reaction 4. Under these conditions, I am able to produce $CCl_4$ free from $CS_2$ and containing only traces of $SCl_2$ and $S_2Cl_2$, which are easily removed as previously noted and may be recycled. Assuming a 100 per cent excess of $SCl_2$, the net result of the reactions as they take place in my process is for practical purposes as follows:

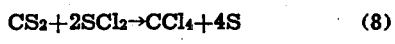

$$CS_2 + 4SCl_2 \rightarrow CCl_4 + 2S_2Cl_2 + 2S \qquad (9)$$

Comparing Reaction 9 with Reaction 8 it will be seen that when an excess of $SCl_2$ is used the quantity of sulphur thrown out is diminished. However, if the excess is not more than 100 per cent the sulphur thrown out is sufficient to balance that introduced as $CS_2$ and may be recycled as such. It will also be seen that the excess $SCl_2$ appears as $S_2Cl_2$. This excess $S_2Cl_2$ of course finds its way to the bottom plate along with the sulphur liberated by the reaction. The latter therefore comes off in solution in the former, from which it may be readily separated by distillation. The $S_2Cl_2$ may then be chlorinated back to $SCl_2$ and recycled. The use of an excess of $SCl_2$ offers the advatnage that it enables the process to be operated at a temperature below 120° C., the melting point of sulphur.

Reaction 9, which in a batch operation would be utterly impossible, is therefore by my process rendered entirely practicable.

Instead of sulphur dichloride, I may employ sulphur monochloride as the chlorinating agent. In this case, there is no intermediate product and only one reaction takes place. However, unlike elemental chlorine and $SCl_2$, a slight excess of which causes the reaction to go to completion with respect to the $CS_2$, $S_2Cl_2$ does not react to completion with respect to $CS_2$ unless in infinite excess. This condition is theoretically possible only in a column of infinite height. In practice, therefore, I find that $S_2Cl_2$ by itself is a less satisfactory chlorinating agent than $SCl_2$.

When elemental chlorine is the chlorinating agent employed in my process the attack on the iron of the column is very severe and the same is true to only a slightly less extent when sulphur dichloride is the agent. I have therefore worked out a compromise in which I employ a mixture of sulphur dichloride and sulphur monochloride which may be in the proportions of one molecule of the former to one and one-half of the latter. In this way I am able, without serious attack upon the reactor, to secure a crude product free from $CS_2$ and containing only such minor quantities of $SCl_2$ and $S_2Cl_2$ as can be readily eliminated. The final result of the reaction may then be summed up as follows:

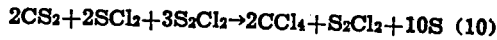

$$2CS_2 + 2SCl_2 + 3S_2Cl_2 \rightarrow 2CCl_4 + S_2Cl_2 + 10S \qquad (10)$$

It will be noted that in this reaction a quantity of $S_2Cl_2$ equivalent to that derived from the $SCl_2$ reaches the base of the column, from which it is drawn off with the sulphur. Enough sulphur is removed to balance the sulphur introduced to the system as $CS_2$. The remainder, together with the $S_2Cl_2$, is chlorinated to reconstitute the original mixture of sulphur monochloride and dichloride, which is then recycled.

Referring to the drawing:

In this figure I have illustrated, diagrammatically, typical apparatus for carrying out my process when sulphur dichloride or a mixture of sulphur dichloride and sulphur monochloride is used as the chlorinating reagent. In this drawing, 1 indicates the storage for $CS_2$ and 2 the storage for $SCl_2$ or $SCl_2$ and $S_2Cl_2$. Storage 1 is replenished through pipe 3 and valve 4. The $CS_2$ in storage 1 is lifted by pump 5, driven by motor 6, and delivered through pipe 7 to bubble cap column 8 at point 9. $SCl_2$ or a mixture of $SCl_2$ and $S_2Cl_2$ is raised by pump 10 driven by motor 11 and delivered through pipe 12 and valve 13 to reactor 8 at point 14. Reactor 8 is provided with bubble cap plates 15, 15 and, at its base, with receiver 16. Receiver 16 is preferably equipped with steam jacket 17. The $SCl_2$ and $S_2Cl_2$ in liquid phase, descend from plate to plate, forming pools on the plates. The $CS_2$, vaporized by heat of the steam jacket, or by the heat of the reaction itself, rises in the column, bubbling through pools of liquid on the plates.

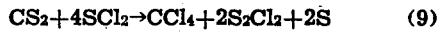

If SCl₂ is the reagent and is used by itself the process is regulated to proceed as in Equation 9. In that case, upon the plates adjacent to point 14 the reaction will proceed mostly as in Equation 4. Some of the SCl₂ will, however, spill over unreacted and flow downward with the S₂Cl₂ formed by the reaction. This S₂Cl₂ will react with more CS₂ as in Equation 2. As the liquids descend from plate to plate a point will be reached at which Reaction 2 will begin to predominate. Molten sulphur, or sulphur in solution will also begin to be an important constituent of the liquids and the proportion of sulphur will become greater and greater as the liquid descends. On the lowermost plate the pool of liquid will consist largely of molten sulphur, with only a small amount of residual S₂Cl₂. This pool is scrubbed with CS₂, which is in great excess over the S₂Cl₂ reaching that point and the S₂Cl₂ largely eliminated as in Equation 6.

If S₂Cl₂ is also present the process is preferably regulated to proceed in accordance with Equation 10. In that case any residual SCl₂ finding its way to the lowermost plate will be scrubbed out of a pool consisting of sulphur in solution in S₂Cl₂.

The elemental sulphur liberated by the reaction, in molten condition or in solution in S₂Cl₂, finds its way into receiver 16. Thence it is drawn off through pipe 18. If the sulphur is molten, a part of it may be used to replenish the CS₂. The balance is transferred to the chlorinator, about to be described, and chlorinated to replenish the SCl₂ used in the same period of time. If the sulphur is in solution in S₂Cl₂, a portion of this solution is diverted to still 19 by opening valve 20. The quantity allowed to enter still 19 from time to time should be sufficient to contain a quantity of sulphur equivalent to that entering the system as CS₂ in the same time. Still 19 is provided with steam jacket 21, by means of which the S₂Cl₂ is distilled off from the sulphur. The latter is discharged through valve 22 and used to replenish the CS₂ or otherwise as desired. The vaporized S₂Cl₂ is transferred through pipe 23 and valve 24 to chlorinator 25, where it is condensed by cold water flowing through jacket 26. The balance of the solution of sulphur in S₂Cl₂ is passed directly to chlorinator 25 through pipe 27 and valve 28. Chlorine is then admitted through pipe 29 and valve 30 and the mixture of S₂Cl₂ and elemental sulphur chlorinated just sufficiently to replenish the original mixture of SCl₂ and S₂Cl₂ used in the same period of time. When the chlorination is finished, the charge is blown over into storage 2, by means of compressed air admitted through pipe 31 and valve 32. During this operation valve 37 may be opened, allowing storage 2 to be vented through pipe 38.

The CCl₄ produced by the reaction, being more volatile than the S₂Cl₂ or elemental sulphur, bubbles upward with the CS₂ through the pools of liquid on the plates. Above point 14 the CCl₄ continues upward, carrying a small quantity of SCl₂ and S₂Cl₂. The latter is fractionated out on the plates between point 14 and point 39, at which point the liquid product is drawn off through pipe 40 to storage not shown.

Above point 39 the residual SCl₂, if any, continues to rise, the CCl₄ being fractionated out of it, until it finally leaves the column at point 41, still in vapor phase. This SCl₂ is then liquefied in condenser 42 and returned to the column at point 43.

If elemental chlorine is the chlorinating agent employed, still 19 and chlorinator 25 become superfluous. In that case only molten sulphur will be drawn off from receiver 16 and the quantity will necessarily be just sufficient to replenish the CS₂.

At the point of introduction of the CS₂ into the column there is of course a slight back pressure caused by the resistance of the aggregate head of liquids on the plates; but in practice this does not exceed 2 pounds per square inch and is generally less.

The temperature at various points in the column depends upon whether the chlorine is introduced as elemental chlorine, as SCl₂ or S₂Cl₂; also upon the rate of admission of the reagents and the temperature maintained in the base of the column by the steam jacket. In practice, the conditions are regulated so that the CS₂ is immediately vaporized and the sulphur is in a molten state, but the S₂Cl₂ is maintained in liquid phase.

*Example*

In an apparatus of the type illustrated and described, including a 58 plate column 4 inches in diameter and 29 feet high, 76 pounds of CS₂ were introduced at point 9. A mixture consisting of 134 pounds of SCl₂ and 261 pounds of S₂Cl₂ were introduced in the same period of time at point 14. 150 pounds of sulphur and 163 pounds of S₂Cl₂ were drawn off from receiver 16 and 158 pounds CCl₄ product drawn off at point 39. The latter contained 4 pounds or 2.56 per cent of SCl₂ but no CS₂ or S₂Cl₂. The product was purified by treatment with lime and yielded 154 pounds of high grade carbon tetrachloride.

It will be noted that in this example the yield of carbon tetrachloride was substantially quantitative with respect to both the sulphur chloride and the carbon disulphide. It will also be noted that the elemental sulphur drawn off was more than sufficient to replace that introduced as CS₂ and that the S₂Cl₂ drawn off was more than equivalent to that derived from the SCl₂ by the reaction.

My process as above described is of course essentially a continuous process and on that account advantageous as compared with the batch processes heretofore used. It has, moreover, the further advantage that it avoids the hazards incident to operations carried out with large bodies of carbon disulphide.

In the drawing I have illustrated the column as of the bubble cap plate type; but, although I prefer that type of reactor, it is to be understood that I do not wish to be limited thereto, as a packed column or other equivalent reactor might possibly be made to serve the purpose.

Although I have described the foregoing process as carried out by means of elemental chlorine or sulphur dichloride or monochloride, I do not wish to be limited to those reagents, as other chlorinating agents, such as sulphuryl chloride, antimony pentachloride, etc., are theoretically suitable chlorinating agents.

I have described my invention as illustrated by the reaction of chlorine with carbon disulphide. However, I do not wish to be limited to this reaction as my invention is generally applicable to reactions which in a batch operation tend to reach an equilibrium and stop and which reverse when an effort is made to recover the products. In general, my invention is applicable to reactions in which one of the reagents and an end product or intermediate product boils at a relatively high temperature, compared with the other reagent or product, if any, or both; or, in short, to any reaction in which, by temperature control, one reagent can be caused to pass in vapor phase in contact with successive pools of the other reagent or one of its intermediates or end products moving in liquid phase in the opposite direction.

I claim as my invention:

1. The process for production of carbon tetrachloride which comprises causing a large excess of sulphur monochloride to descend in a reaction zone of a column reactor, in liquid phase, counterflow with respect to carbon disulphide rising therein in vapor phase, producing carbon tetrachloride and liberating sulphur; causing the free sulphur to descend in said reaction zone; causing the carbon tetrachloride to rise in said reaction zone, in vapor phase; and withdrawing free sulphur and excess sulphur monochloride from below and carbon tetrachloride from above said reaction zone.

2. The process for production of carbon tetrachloride which comprises causing carbon disulphide to rise through a lower reaction zone of a column reactor to a higher reaction zone of said column, in vapor phase; there chlorinating the carbon and sulphur substantially completely out of it, producing carbon tetrachloride and sulphur monochloride; causing the sulphur monochloride to descend in said lower reaction zone in liquid phase, counterflow with respect to more carbon disulphide rising therein in vapor phase, producing more carbon tetrachloride and liberating sulphur; causing the free sulphur to descend in said lower reaction zone; causing the carbon tetrachloride to rise in said lower reaction zone and, together with the carbon tetrachloride produced in said higher reaction zone, to rise in said higher reaction zone, in vapor phase; and withdrawing free sulphur from below said lower reaction zone and carbon tetrachloride from above said higher reaction zone.

3. The process for production of carbon tetrachloride which comprises causing carbon disulphide to rise through a lower reaction zone of a column reactor to a higher reaction zone of said column, in vapor phase; there subjecting it to elemental chlorine, producing carbon tetrachloride and sulphur monochloride; causing the sulphur monochloride to descend in said lower reaction zone, in liquid phase, counterflow with respect to more carbon disulphide rising therein in vapor phase, producing more carbon tetrachloride and liberating sulphur; causing the free sulphur to descend in said lower reaction zone; causing the carbon tetrachloride to rise in said lower reaction zone and, together with the carbon tetrachloride produced in said higher reaction zone, to rise in said higher reaction zone, in vapor phase; and withdrawing free sulphur from below said lower reaction zone and carbon tetrachloride from above said higher reaction zone.

4. The process for production of carbon tetrachloride which comprises causing carbon disulphide to rise through a lower reaction zone of a column reactor to a higher reaction zone of said column, in vapor phase; there subjecting it to sulphur dichloride, producing carbon tetrachloride and sulphur monochloride; causing the sulphur monochloride to descend in said lower reaction zone, in liquid phase, counterflow with respect to more carbon disulphide rising therein in vapor phase, producing more carbon tetrachloride and liberating sulphur; causing the free sulphur to descend in said lower reaction zone; causing the carbon tetrachloride to rise in said lower reaction zone and, together with the carbon tetrachloride produced in said higher reaction zone, to rise in said higher reaction zone, in vapor phase; and withdrawing free sulphur from below said lower reaction zone and carbon tetrachloride from above said higher reaction zone.

5. The process for production of carbon tetrachloride which comprises causing carbon disulphide to rise through a lower reaction zone of a column reactor to a higher reaction zone of said column, in vapor phase; there subjecting it to a mixture of sulphur dichloride and sulphur monochloride, producing carbon tetrachloride and sulphur monochloride and liberating sulphur; causing the free sulphur and sulphur monochloride to descend in said lower reaction zone, in liquid phase, counterflow with respect to more carbon disulphide rising therein in vapor phase, producing more carbon tetrachloride and liberating more sulphur; causing the free sulphur to descend in said lower reaction zone; causing the carbon tetrachloride to rise in said lower reaction zone and, together with the carbon tetrachloride produced in said higher reaction zone, to rise in said higher reaction zone, in vapor phase; and withdrawing free sulphur from below said lower reaction zone and carbon tetrachloride from above said higher reaction zone.

6. The process for production of carbon tetrachloride which comprises causing carbon disulphide to rise through a lower reaction zone of a column reactor to a higher reaction zone of said column, in vapor phase; there subjecting it to an excess of sulphur dichloride, producing carbon tetrachloride and sulphur monochloride; causing the sulphur monochloride to descend in said lower reaction zone, in liquid phase, counterflow with respect to more carbon disulphide rising therein in vapor phase, producing more carbon tetrachloride and liberating sulphur; causing the free sulphur to descend in said lower reaction zone; causing the carbon tetrachloride to rise in said lower reaction zone and, together with the carbon tetrachloride produced in said higher reaction zone, to rise in said higher reaction zone, to a rectifying zone, in vapor phase; and withdrawing free sulphur and excess sulphur monochloride from below said lower reaction zone and carbon tetrachloride and excess sulphur dichloride from different portions of said rectifying zone.

7. The process for production of carbon tetrachloride which comprises causing a large excess of sulphur monochloride to descend to a reaction zone of a column reactor, in liquid phase, counterflow with respect to carbon disulphide rising therein in vapor phase, producing carbon tetrachloride and liberating sulphur; causing the free sulphur to descend in said reaction zone; causing the carbon tetrachloride to rise in said reaction zone, in vapor phase; withdrawing free sulphur and excess sulphur monochloride from below and carbon tetrachloride from above said reaction zone; and treating a part of the withdrawn sulphur to replace sulphur monochloride used up in the reaction.

8. The process for production of carbon tetrachloride which comprises causing carbon disulphide to rise through a lower reaction zone of a column reactor to a higher reaction zone of said column, in vapor phase; there subjecting it to sulphur dichloride, producing carbon tetrachloride and sulphur monochloride; causing the sulphur monochloride to descend in said lower reaction zone in liquid phase, counterflow with respect to more carbon disulphide rising therein in vapor phase, producing more carbon tetrachloride and liberating sulphur; causing the free sulphur to descend in said lower reaction zone; causing the carbon tetrachloride to rise in said lower reaction zone and, together with the carbon tetrachloride produced in said higher reaction zone, to rise in said higher reaction zone, in vapor phase; withdrawing free sulphur from below said lower reaction zone and carbon tetrachloride from above said higher reaction zone; and treating a part of the withdrawn sulphur to restore sulphur dichloride used up in the reaction.

9. The process for production of carbon tetrachloride which comprises causing a large excess of sulphur monochloride to descend in a reaction zone of a column reactor, in liquid phase, counterflow with respect to carbon disulphide rising therein in vapor phase, producing carbon tetrachloride and liberating sulphur; causing the free sulphur to descend in said reaction zone; causing the carbon tetrachloride to rise in said reaction zone, in vapor phase; withdrawing free sulphur and excess sulphur monochloride from below and carbon tetrachloride from above said reaction zone; and treating a part of the withdrawn sulphur to replace sulphur monochloride and another part of the withdrawn sulphur to replace the carbon disulphide used up in the reaction.

10. The process for production of carbon tetrachloride which comprises causing carbon disulphide to rise through a lower reaction zone of a column reactor to a higher reaction zone of said column, in vapor phase; there subjecting it to sulphur dichloride, producing carbon tetrachloride and sulphur monochloride; causing the sulphur monochloride to descend in said lower reaction zone, in liquid phase, counterflow with respect to more carbon disulphide rising therein in vapor phase, producing more carbon tetrachloride and liberating sulphur; causing the free sulphur to descend in said lower reaction zone; causing the carbon tetrachloride to rise in said lower reaction zone and, together with the carbon tetrachloride produced in said higher reaction zone, to rise in said higher reaction zone, in vapor phase; withdrawing free sulphur from below said lower reaction zone and carbon tetrachloride from above said higher reaction zone; and treating a part of the withdrawn sulphur to replace the sulphur dichloride and another part of the withdrawn sulphur to replace the carbon disulphide used up in the reaction.

JOY E. BEANBLOSSOM.